July 12, 1955  P. PATZ ET AL  2,712,760

CHAIN LINKS

Filed May 10, 1952

INVENTORS
P. Patz
E. A. Graetz
BY Lieber & Lieber
ATTORNEYS.

United States Patent Office 2,712,760
Patented July 12, 1955

2,712,760

CHAIN LINKS

Paul Patz and Edward A. Graetz, Pound, Wis.

Application May 10, 1952, Serial No. 287,102

2 Claims. (Cl. 74—249)

Our present invention relates generally to improvements in chain structures, and relates more specifically to improvements in the construction and operation of links cooperable with similar adjoining links to form an elongated conveyor chain adapted for diverse uses.

The primary object of this invention is to provide a sturdy chain assemblage in which a succession of interchangeably similar links are so united and cooperable that they may swing in any direction relative to each other while still being readily separable to interrupt the chain whenever so desired.

Another important object of the invention is to provide an improved chain link which may be associated with other similar links to produce an elongated chain which may be bent or rocked either laterally or transversely of its length without danger of having the links separate or come apart.

A further important object of our invention is to provide an improved conveyor chain adapted to travel longitudinally either up or down or sidewise, and wherein the links may be parted to interrupt a chain having relatively slight slack therein and without disturbing the chain driving sprockets and guides and without providing special links, parting connectors, or tools.

Still another important object of the present invention is to provide an improved chain composed of a series of precisely similar durable links of simple construction, all of which are maintained in predetermined position during normal advancement of the assembled chain.

An additional object of this invention is to provide a durable conveyor chain especially adapted to advance a series of flights or scrapers along a definite path while being retained in desired position relative to such path, and which may be safely and effectively utilized for various purposes.

These and other more specific objects and advantages of the invention will be apparent from the following detailed description, from which it will be apparent that the gist of the present invention is the provision of a simple but exceedingly strong link structure adapted to be quickly and readily assembled into an elongated draft chain adapted to be universally bent or rocked in any direction while maintaining pivotal surface contact between the adjoining links and without danger of having these links separate during normal operation of the conveyor, while still permitting parting of selected adjacent similar links with the aid of minimum slack in the chain whenever so desired.

A clear conception of the features constituting our present improvement and of the construction and operation of a typical commercial conveyor chain embodying the invention, may be had by referring to the drawing accompanying and forming a part of this specification in which like reference characters designate the same or similar parts in the various views.

Figure 1:
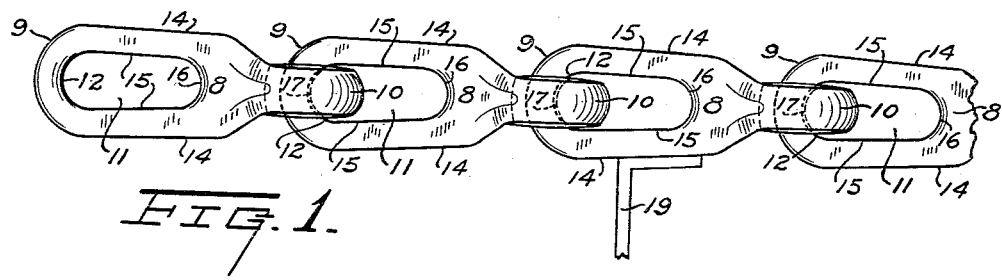
Fig. 1 is a side view of several of the improved links assembled into a rectilinear chain, one of the links having a material conveying flight secured to and depending therefrom.

While the invention has been shown and described by way of illustration, as being especially and advantageously useful in connection with conveyor chains for barn cleaners, it is not our desire or intention to restrict its adaptability to such use, and it is also contemplated that specific descriptive terms utilized herein be given the broadest possible interpretation consistent with the disclosure.

Referring to the drawing, each of the improved chain links shown therein, comprises a relatively flat elongated and rather wide body 8 of approximately uniform thickness having an arcuate transversely curved outer surface 9 at one end and a hook 10 formed integral with its opposite end, while the intermediate portion of the body 8 is provided with a central longitudinal opening 11 the end 12 of which nearest to the curved end surface 9 is similarly transversely curved and may also be slightly laterally curved. The opposite sides 14 of the body 8 may be tapered toward the hook 10, and the opposite sides 15 of the opening 11 are preferably likewise tapered and may be connected at the hook end of the opening by another transversely and laterally curved surface 16. The hook 10 is preferably disposed centrally of the body 8 in longitudinal alinement with the opening 11 and is of substantially the same width as the narrowest end of this opening but is somewhat narrower than the widest opening end. The interior of the hook 10 is bounded by a transversely and laterally arcuately curved surface 17 while the free end of this hook is inclined toward but is spaced from the smaller end of the body 8 a distance slightly greater than the body thickness adjacent to the curved end surface 9.

Figure 2:
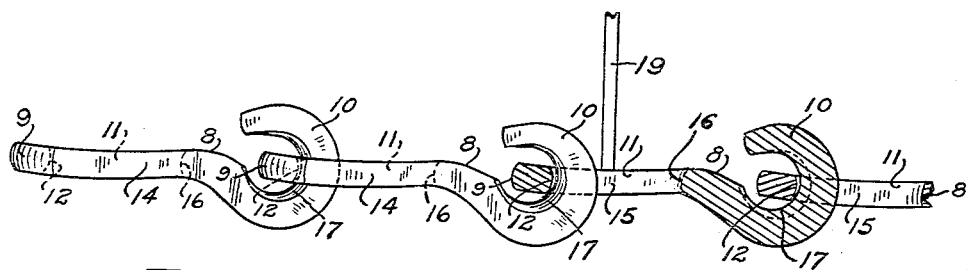
Fig. 2 is a top view of the chain and flight assembly of Fig. 1, a central longitudinal section having been taken through the flight carrying link.
Figures 3, 4, 5:
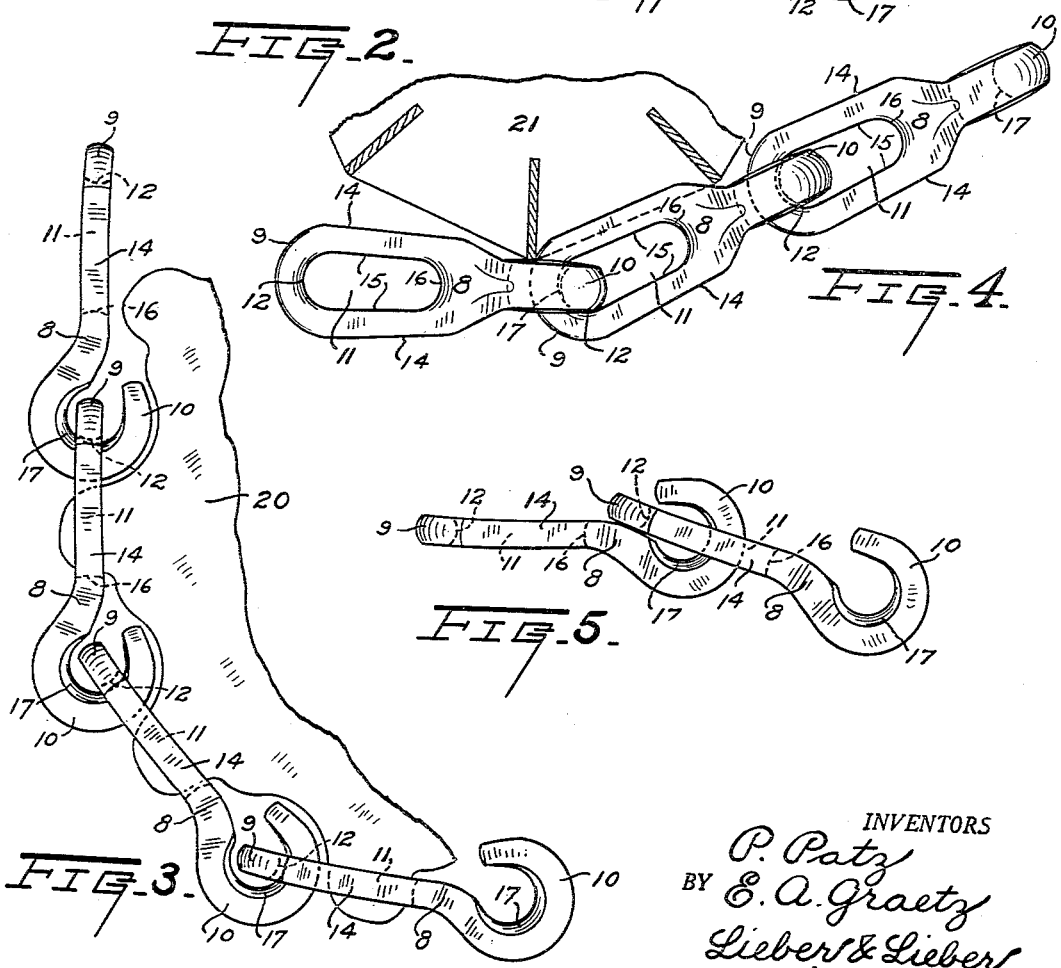
Fig. 3 is a view showing a conveyor chain composed of the improved links, traveling horizontally about a fragment of a driving sprocket.
Fig. 4 is a side view showing a conveyor chain embodying the improved links, traveling in upright position along a guide for deflecting the chain path from horizontal to an inclined position.
Fig. 5 is a top view of two adjoining links of a conveyor chain, illustrating the mode of unhooking or parting the links.

All of these links are of interchangeable, similar construction, and they may be formed of durable metal such as steel either by forging or casting with the bends of the hooks 10 considerably thicker than the bodies 8. They may thereafter be readily assembled into a chain of any desired length and forming a continuous loop if so desired, by merely applying the hooks 10 of the successive links to the rounded ends of the bodies 8 of adjacent links as shown in Fig. 5. When such a chain has been produced and is utilized as a conveyor for scraper flights 19 as in Figs. 1 and 2, these flights 19 may be welded or otherwise rigidly attached to selected links of the series so as to avoid obstructing the openings 11. The chain thus formed may also be caused to cooperate with guide wheels 21 as shown in Fig. 4, or with driving sprockets 20 as depicted in Fig. 3, or with ordinary arcuate guide plates in a well known manner, in order to cause the flexible conveyor to travel in any direction while maintaining the links and flights in proper position relative to the path of advancement.

During normal use of a conveyor chain thus assembled and installed, the successive links may be caused to cooperate with the teeth of one or more sprockets 20 as indicated in Fig. 3, rotating in either direction but preferably with the sprocket teeth engaging the hooks 10 so as to prevent separation of the links, and with one or more guide plates and guide wheels 21 as in Fig. 4, with sufficient slack in the straight runs of the chain to prevent binding. As the links travel about the periphery of the sprocket 20 the openings 11 in the successive link bodies 8 receive the sprocket teeth thus advancing the conveyor chain longitudinally in the desired direction and causing the flights 19 to travel along a definite path with the flat bodies 8 disposed perpendicular to the path of advancement. The arcuate end surfaces 12 will then rock or pivot transversely upon the adjacent arcuate surfaces 17 of the adjoining hooks 10, as illustrated in Fig. 3 and during subsequent advancement of the chain the links may be caused to engage an arcuate guide or a guide wheel 21 thereby causing lateral swinging and directing them at an angle relative to each other, as in Fig. 4. During these changes in direction of travel, the bodies 8 of the links will still remain vertical but the arcuate end surfaces 12 of the adjoining links will then rock or pivot transversely and laterally relative to the hook surfaces 17 of the adjoining links, so that these cooperating surfaces 12, 17 will accommodate changes of advancement in any direction without necessarily changing the vertical disposition of the link bodies 8.

If it becomes desirable for any reason to interrupt the continuity of the chain, this may be quickly and conveniently accomplished at one of the elongated runs or stretches of the conveyor while idle, without the aid of special tools and without disengaging the chain from the sprockets 20 or guide plates 21, by merely sliding the arcuate end 9 of one of the links through the gap between the free end of the hook 10 and the body 8 of the adjoining link until the links clear each other, and by thereafter withdrawing the hook 10 laterally from the adjacent opening 11 as in Fig. 5. It has been found that with less than three inches of slack in a conveyor chain having links approximately seven inches in length and openings substantially three inches long, such separation or parting of the chain is readily possible. This amount of slack is not excessive and will not permit the links to separate accidentally during normal operation of the conveyor. The links may also be just as conveniently reunited to again place the conveyor in operating condition, and the term "transversely" as used herein designates swinging from side to side while the term "laterally" defines pivoting across the thickness of the links.

From the foregoing detailed description it will be apparent that our present invention in fact provides an improved chain link which may be readily associated with other similar links to produce an elongated flexible chain adapted to be bent or rocked in any direction either laterally or transversely of its length without danger of having the links separate during normal operation, but wherein such separation may be effected at any time by merely utilizing the requisite slack in the chain. The improved links may be readily formed of sturdy construction and of various sizes for diverse purposes, and are especially useful in connection with conveyors having blades or flights for transporting loose materials along definite paths, and due to the interchangeably similar construction of the links it is impossible to make mistakes while assembling the same into chains and also permits assemblage of chains of any desired length. The invention has proven highly satisfactory and successful especially in connection with endless conveyors of the barn cleaner type, but the improved links may also be utilized for other purposes.

It should be understood that it is not desired to limit this invention to the exact details of construction or to the precise mode of use, herein shown and described, for various modifications within the scope of the claims may occur to persons skilled in the art.

We claim:

1. A continuous sprocket chain conveyor articulatable in two planes transversely of each other and composed of a succession of interchangeable, similar, relatively detachable links each comprising, an integral flat elongated rigid forged body of approximately uniform thickness having therein an elongated longitudinally extending opening forming opposite side bars, said body being provided at one end of said opening with an arcuate transverse member formed integral with said side bars and having curved inner and outer end bounding surfaces, and at the opposite end of said opening with a hook formed integral with said side bars and extending longitudinally from said body and being of slightly less width than that of the opening and disposed in the central longitudinal plane located at a right angle to the body and passing through the opening, the interior of said hook being bounded by a surface curved transversely to conform with the transverse curvature of said transverse member whereby the succession of links are relatively universally articulatable, and the free end of said hook being spaced from said body by a gap having a width slightly greater than the thickness of the transverse member measured in said central plane while the length of said opening measured in the same plane is sufficient to effect separation of adjoining links by relatively sliding said arcuate transverse member of one link through the hook gap of the adjacent link longitudinally of the chain and by subsequently swinging said link transverse member in said central plane over and away from the free end of the hook of the adjacent link.

2. A continuous sprocket chain conveyor in accordance with claim 1 wherein some of the successive links are provided with laterally extending flights secured to corresponding side bars thereof.

References Cited in the file of this patent

UNITED STATES PATENTS

| | | |
|---|---|---|
| 454,998 | Gilbert | June 30, 1891 |
| 480,853 | Mars | Aug. 16, 1892 |
| 601,347 | Leaycraft | Mar. 29, 1898 |
| 660,605 | Vandercook | Oct. 30, 1900 |
| 1,512,609 | Koelkebeck | Oct. 21, 1924 |
| 1,923,201 | Hedfors | Aug. 22, 1933 |
| 1,939,346 | Green | Dec. 12, 1933 |
| 2,070,362 | Kreutz | Feb. 9, 1937 |
| 2,243,274 | Ernst | May 27, 1941 |
| 2,672,059 | Graetz et al. | Mar. 16, 1954 |